M. A. Smith,
Corn Harvester.

No. 107,972.      Patented Oct. 4, 1870.

Inventor:
Merrot Smith

Witnesses:
Asahel A. Jarvis
Chas. W. Smith

UNITED STATES PATENT OFFICE.

MENZO A. SMITH, OF MIDDLEFIELD, NEW YORK.

IMPROVEMENT IN CORN-HARVESTERS.

Specification forming part of Letters Patent No. 107,972, dated October 4, 1870.

*To all whom it may concern:*

Be it known that I, MENZO A. SMITH, of the town of Middlefield, county of Otsego and State of New York, have invented a new and useful Machine for Picking and Husking Corn, of which the following is a full and clear description, reference being had to the accompanying drawings, making a part of this specification, in which—

Figure 1:
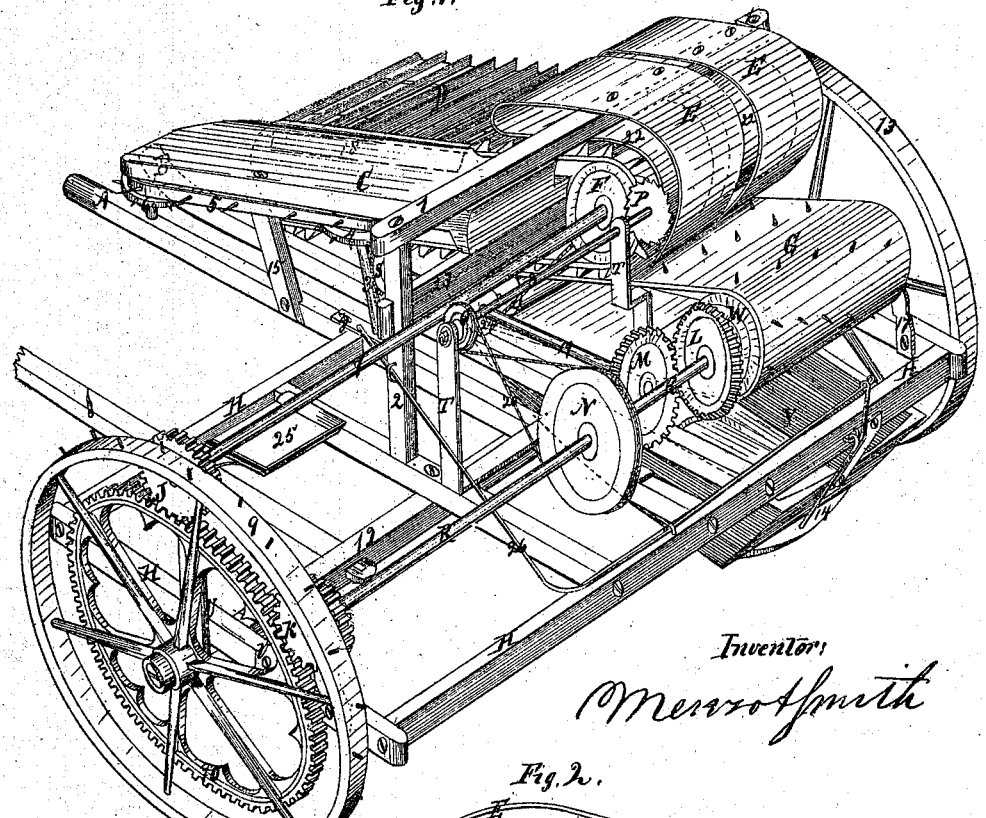
Figure 2:
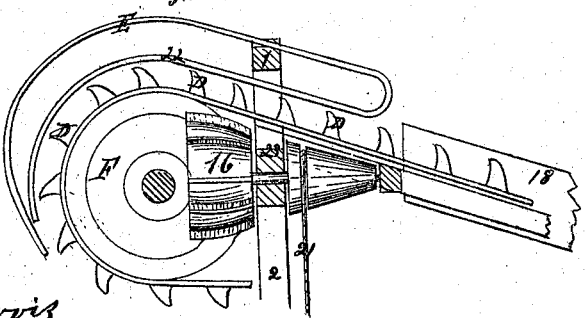

Figure 1 is a perspective view of the whole machine, and Fig. 2 a section showing the construction of a spur or ribbed cylinder under the slatted apron.

The object of my invention is to construct a machine which, by being drawn through the field by a team, will pick the ears of a row of corn from the stalk, husk and drop them into a hopper as it passes along, and thereby do by machinery what has heretofore been done by hand.

H is the frame, which is constructed of wood; but it may be constructed of either wood or iron. 12 is the axle-tree. I is the pole to which the team is attached.

A and B are fingers, securely fastened to the frame-work H and axle-tree 12. Said fingers bow outward from each other at the forward end, for the purpose of gathering the stalks between them. 6 is a spur-pulley, which, as the machine advances, turns the stalks into the said machine; and 5 is a spur-belt, which passes around the aforesaid pulley 6, drawing the stalks into the space between the cap and knife.

C is the cap, and 18 (the figure upon it in dotted lines) represents the knife, which is secured to the belt-frame back of the cap C, at a sufficient distance from said cap to let the corn-stalks pass between them, but not the ears. Said cap and knife are placed on an incline the highest at the back end, so that the lower ears of corn will be cut at the forward end, and higher ones will pass farther back, according to their respective heights. Both cap and knife have the same inclination, with the knife a little lower than the cap.

The butts of the ears, as they are brought into the machine, strike on the cap C, which throws them over on the knife, that separates them from the stalk, or a series of revolving circular saw-cutters, with or without teeth, may be used.

D is a slatted apron. It is constructed of two narrow bands or belts, one on each side, with an open space between them, and pieces of wood or other suitable material properly fastened across both bands or narrow belts at a sufficient distance apart to form corrugations large enough to hold an ear of corn, and the width of the belt being sufficient to retain the longest ears.

E E are spring-caps, which hold the ears of corn in the corrugations of the belt while they are being operated upon.

16, Fig. 2, is a spur or ribbed cylinder under the slatted apron. Said cylinder operates upon the under side of the ears of corn in the center between the bands of the aforesaid belt D, the slats being hollowed from the under side, forming a space occupied by cylinder 16, Fig. 2, that the ears, as they move back, may have a bearing upon said cylinder, and be moved in the corrugations until the butts bear against gage 22, said gage being so arranged that the butts of the ears strike against it, and not the stem, as some might be cut with pieces of stem longer than others. Said gage 22 may be constructed as a part of cap C, or an adjustable independent gage may be used.

P is a saw or knife, which, after the ears leave the gage, cuts off the butts of said ears, thereby loosening the husks.

G is a belt with spurs on it, for the purpose of taking the husks from the ears. The upper side of this belt moves in the opposite direction to the under side of the slatted apron, tearing off the husks and leaving them behind the machine, while the under side of the slatted apron carries the ears forward and drops them into the hopper Y under the machine. 9 and 13 are the wheels which carry the machine, and on which it moves.

10 is a gear-wheel, securely fastened to wheel 9, making a part of the same, and forming a driving-wheel to operate the machine. Wheel 13 can also be constructed and used as a driving-wheel, if desired.

K is a pinion, which meshes into the driving-wheel. R is a shaft, on which the said pinion K is secured. N is a pulley on shaft R; and 20 is a band or belt connecting pulley N with pulley O and saw P on shaft 8, by which the said saw or knife is operated. T is the support and bearing of shaft 8. W is the pulley on shaft R, which operates the husking-belt G.

L is a bevel-gear on shaft R. It meshes into a similar gear-wheel, M, on shaft 19, and operates said shaft. 24 is a pulley on shaft 19, which, by band or belt 21, drives the ribbed or spur cylinder 16, Fig. 2. S is a bevel-gear on shaft 19, which meshes into a gear-wheel on shaft 3 and pulley 4, operating the spur-belt 5 and the spur-pulley 6.

Z is a bearing for shaft 19. The other bearing of shaft 19 is behind gear-wheel M, and does not show in the drawing.

J is a pinion on shaft 7. Said pinion meshes into the driving-wheel and operates the aforesaid shaft 7.

F is a pulley upon shaft 7, which operates the slatted apron D. Said belt revolves around a similar pulley at the forward end of the machine. 15 is the standard which supports cap C.

2, 1, and 23 is the frame which supports and to which are attached the inclined cap C, spring-caps E E, bearing for spur or ribbed cylinder 16, Fig. 2, and frame for slatted apron D.

U is a bearing for shaft 7. The bearing at the other end of shaft 7 does not show in the drawing. V V and 17 are bearings for shaft R. 25 is the seat for driver.

What I claim as my invention, and desire to secure by Letters Patent, is—

1. The incline cap C and knife 18, in combination with the spur-belt 5 and spur-pulley 6, all constructed and arranged as described, for the purpose specified.

2. The spring-caps E E, in combination with the slatted apron D and spur-cylinder 16, constructed and arranged as described, for the purpose specified.

3. The arrangement of the apron D, spring-caps E E, spur-cylinders 16, gage 22, saw P, husking-belt G, and hopper Y, all constructed and operating as described, for the purpose specified.

MENZO A. SMITH.

Witnesses:
ASAHEL A. JARVIS,
CHS. W. SMITH.